(12) United States Patent
Simic-Glavaski et al.

(10) Patent No.: US 11,517,012 B2
(45) Date of Patent: Dec. 6, 2022

(54) ELECTRON SOURCE, APPARATUS AND METHOD FOR ORGAN TRANSPLANTS AND STORAGE

(71) Applicants: Branimir Simic-Glavaski, Cleveland, OH (US); Aleksandar Nikolic, Novi Sad (RS)

(72) Inventors: Branimir Simic-Glavaski, Cleveland, OH (US); Aleksandar Nikolic, Novi Sad (RS)

( * ) Notice: Subject to any disclaimer, the term of this patent is extended or adjusted under 35 U.S.C. 154(b) by 781 days.

(21) Appl. No.: 16/372,709

(22) Filed: Apr. 2, 2019

(65) Prior Publication Data

US 2019/0297875 A1    Oct. 3, 2019

Related U.S. Application Data

(60) Provisional application No. 62/652,203, filed on Apr. 3, 2018.

(51) Int. Cl.
*A01N 1/02* (2006.01)

(52) U.S. Cl.
CPC ......... *A01N 1/0226* (2013.01); *A01N 1/0278* (2013.01); *A01N 1/0221* (2013.01)

(58) Field of Classification Search
None
See application file for complete search history.

(56) References Cited

U.S. PATENT DOCUMENTS 5,051,352 A * 9/1991 Martindale .............. A01N 1/02
435/1.2

OTHER PUBLICATIONS

Song et al. "Subdermal flexible solar cell arrays for powering medical electronic implants." Advanced Healthcare Materials 5.13 (2016): 1572-1580. (Year: 2016).*
Yang et al. "A prototype of an implantable thermoelectric generator for permanent power supply to body inside a medical device." Journal of Medical Devices 8.1 (2014). (Year: 2014).*
Otero et al. "Biomimetic electrochemistry from conducting polymers. A review: artificial muscles, smart membranes, smart drug delivery and computer/neuron interfaces." Electrochimica Acta 84 (2012): 112-128. (Year: 2012).*

* cited by examiner

*Primary Examiner* — Emily A Cordas
(74) *Attorney, Agent, or Firm* — Renner, Otto, Boisselle & Sklar, LLP

(57) ABSTRACT

Electrochemical apparatus and method provide a source of electrons to a living organ in the process of transplantation. The organ, depleted of antioxidants, is placed into a vessel supplied with appropriate physiological solution and apparatus that create antioxidative environment.

5 Claims, 1 Drawing Sheet

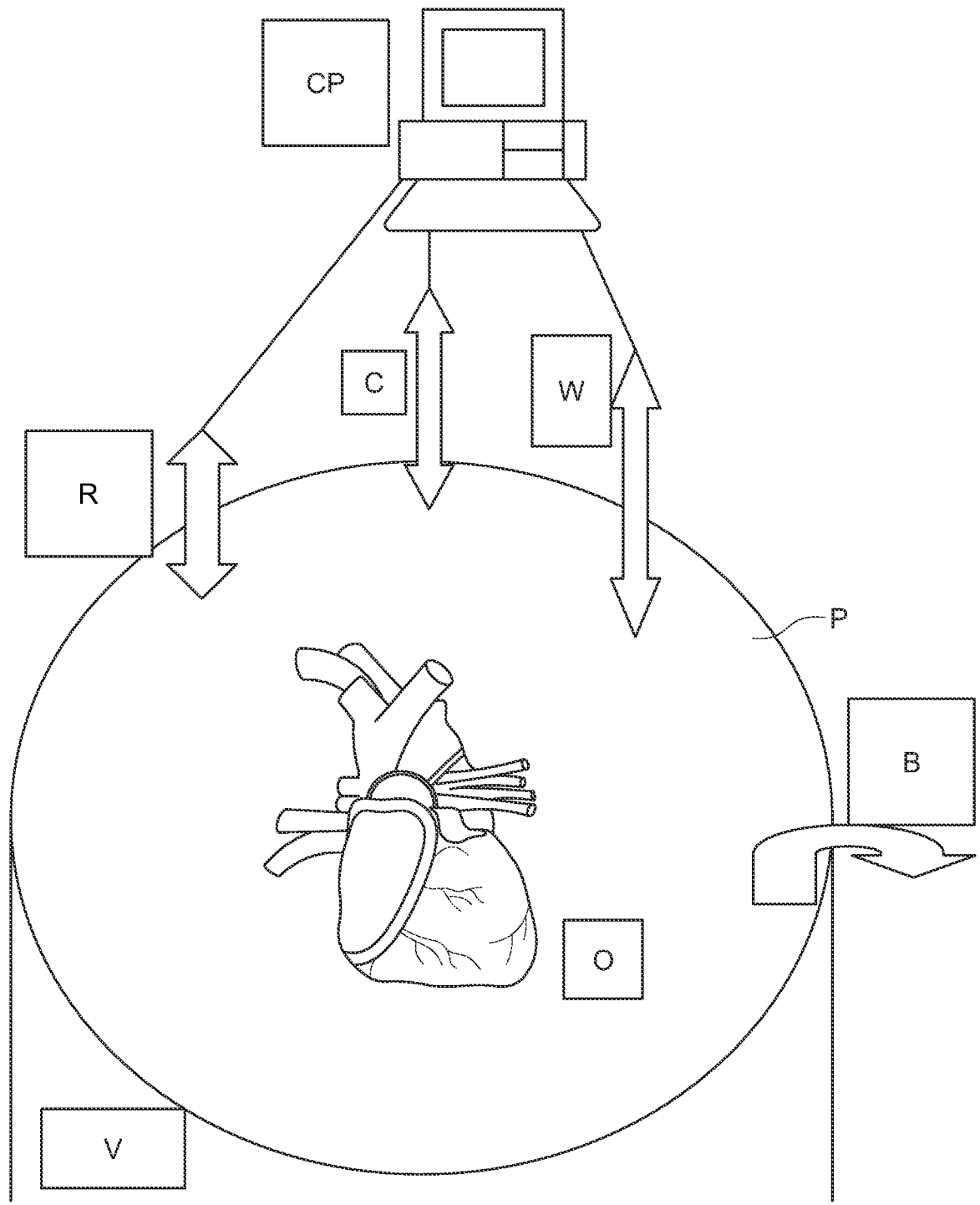

ELECTRON SOURCE, APPARATUS AND METHOD FOR ORGAN TRANSPLANTS AND STORAGE

RELATED APPLICATIONS

This application claims the benefit of U.S. Provisional Application No. 62/652,203 filed Apr. 3, 2018, which is hereby incorporated herein by reference.

FIELD OF INVENTION

The present invention relates generally to control and enhance antioxidant functions in the process of transplanting and/or storing human organs and transplants and to electron source, apparatus and method that reduce oxidative stress in organ transplants.

BACKGROUND

Organ donation is the process of surgically removing an organ or tissue from one person (the organ donor) and placing it into another person (the recipient). Transplantation is necessary because the recipient's organ has failed or has been damaged by disease or injury. Many different types of organs can be transplanted, including the liver, kidney, pancreas, heart, lung, etc.

The majority of human organs around the world are still transferred between donor and recipient using a large cooler box filled with ice, with little advancement since the first successful heart transplant in the 1960s. Despite its widespread use and broad applicability, this method comes with significant limitations. A heart, for example, can typically only be preserved for a maximum of four hours, with this figure dropping to two hours if surgeons want optimal transplant results.

SUMMARY

Oxidants are produced as components of the normal metabolism of all cells. Highly reactive species of oxygen play a critical role in vascular disorders, in inflammatory disease, and aging processes.

An aspect of the invention deals with the phenomena associated with highly reactive oxygen species (hydroxy, peroxy, alkoxy, aroxy, and superoxide radicals as well as singlet oxygen) and their peroxidation products (hydrogen peroxide, hydroperoxides, and epoxides). The reactions of these species and the interrelationship of oxygen radicals and their products are of great importance in bio-systems. As a consequence, these reactions have to be controlled to minimize the adverse effects of oxygen radicals and their products in human organs.

An aspect of the invention provides an antioxydizing mechanism, and provides methods that protect against free radicals as well as other products in vitro and in vivo. This antioxydizing mechanism is able to prevent damage to organ(s) that are prepared for transplantation, by maintaining the quality of transplanted organs and extending their "shelf life".

An aspect of the invention relates to an electron source for organ transplants.

Another aspect of the invention relates to a method for organ transplants.

Another aspect relates to a vessel for holding, storing and/or transporting an organ that is intended for transplant.

Another aspect relates to maintaining an organ for transplant.

According to an aspect of the invention, a method of reducing oxidative stress without depleting the electron content of an organ to be transplanted includes the steps of: placing a human organ within a medium containing a volumetric body, and applying an electric current of sufficient magnitude, to create a reducing environment, to flow through said organ to be transplanted, to provide said reducing environment in which the human organ is held, wherein said applying the electric current comprising supplying free electrons for absorption by said human organ.

Embodiments of the invention may include one or more of the following additional features, alone or in any combination.

The transplanting medium may be in a liquid state.

The electric current may be provided by an electric circuit integrally attached to said volumetric body.

The electric current may be a low voltage DC current.

The voltage during the applying the electric current may be in the range of 1 to 1.5 volts.

The current during the applying the electric current may be in the range of 0.1 to 900 milliamps.

The electric current may be provided by a solar cell.

The electric current may be provided by a thermocouple.

The electric current may be provided by a device showing an electrochemical potentiostat.

According to another aspect of the invention, in a method of an organ to be transplanted in a transplanting process, the improvement comprising during organ transplanting supplying the transplanting organ with electrical input that provides the organ with an excess of electrons, said supplying comprising using electrodes to couple low voltage DC electrical energy, of sufficient magnitude to create a reducing environment to the organs or medium in which the organ is held to supply the excess electrons.

Embodiments of the invention may include one or more of the following additional features, alone or in any combination.

The voltage during the applying the electric current may be in the range of 1 to 1.5 volts, and the current may be in the range of 0.1 to 900 milliamps.

The improvement may further comprise supplying the organ with electrons while simultaneously transplanting organs.

The using electrodes may comprises placing the organ into engagement with the electrodes.

The placing may comprise using the organ to complete a circuit between electrodes.

One or more of the foregoing method steps may be applied to the storing place of the organ in order to prolong life time.

One or more of the foregoing method steps may be applied to the human transporting container in order to prolong life-time of the organ.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 illustrates an embodiment of a transplanting utensil in accordance with the present invention.

DETAILED DESCRIPTION

The invention paves new roads in life sciences and medicine. Oxidants are produced as components of normal metabolism of all cells. Highly reactive species of oxygen play critical role in vascular disorders, inflammatory diseases and aging processes. It is of critical importance to keep these adverse effects under control.

This invention deals with the phenomena associated with highly reactive oxygen species (hydroxy, peroxy, alkoxy, aroxy, and superoxide radicals as well as singlet oxygen) and their peroxidation products (hydrogen peroxide, hydroperoxides, and epoxides). The reactions of these species and the interrelationship of oxygen radicals and their products are of great importance in bio-systems. As a consequence, these reactions have to be controlled. Adverse effects of oxygen radicals and their products in humans have to be minimized.

Antioxydizing mechanism is an aspect of this invention, and provides methods that protect against free radicals as well as other products in vitro and in vivo. This antioxydizing mechanism is able to prevent damage to organ(s) that are prepared for transplantation, by maintaining the quality of transplanted organs and extending their "shelf life".

This invention deals with the phenomena associated with highly reactive oxygen species (hydroxy, peroxy, alkoxy, aroxy, and superoxide radicals as well as singlet oxygen) and their peroxidation products (hydrogen peroxide, hydroperoxides, and epoxides) as they relate to the fields of chemistry, food technology, nutrition, biology, pharmacology and, medicine. The energetics and mechanistic aspects of the reactions of these species and the interrelationship of oxygen radicals (or any other free radicals) and their products is of great importance in biosystems and on the adverse effects of these radicals and products in humans. The effect of free radicals span from the simple chemical models to the complex consideration of clinical medicine.

In this invention we provide the mechanism that protects against free radicals and other products in vitro and in vivo. This invention also provides antioxydizing mechanism in materials, food protection physiological systems. The use of this anti-oxidizing mechanism can prevent damage to an organ being prepared for transplantation, by maintaining the quality of transplanted organs and/or extending their "shelf life".

This invention paves new roads in life sciences and medicine.

Oxidants are produced as components of the normal metabolism of all cells. Highly reactive species of oxygen play a critical role in vascular disorders, in inflammatory disease and aging processes. It is important to control this adverse effect.

Lipids and Cholesterol

It is of vital biological and medical importance to address concerns about oxidative and preventive methods in lipids and cholesterols that are the basic constituents of living cells. Cholesterol is a molecule with a double bond in its structure and as a consequence is susceptible to oxidation and prone to a formation of oxysterols. These oxidation products are commonly found in many products such as foods. Cholesterol is a metabolite required for major biological functions embedded in cell membranes and an integral part of lipid bilayer membranes. Cholesterols are also involved in synthesis of steroids and play also an important role in embryonic development. Cholesterol is prone to oxidation.

The molecules undergo autoxidation by free radical mechanism leading to a number of oxidation products the so-called oxysterols.

Proteins

Another aspect of great importance and research interest related to the oxidative stress is a question of protein oxidation. Protein oxidation appears in a wide range of modifications in protein crosslinking to such modifications as side chain oxidations. Protein oxidation may occur as part of normal regulatory process, as a defense against, or as processes when antioxidant defense is insufficient of oxidative stress. Oxidation of proteins has been considered as irreversible, and ultimately to protein inactivation.

Numerous studies of protein oxidations indicate that there are two-faced modifications. On the one hand, oxidation mechanisms take part in many regulatory processes such as enzyme activity modulation, signaling or gene regulation. On the other hand, oxidative modifications appear when oxidative stress overcomes antioxidant defenses, are damaging. The response of living systems to oxidative stress is of essential importance in understanding cellular defense and aging, neurodegenerative disorders, such as Alzheimer disease, to variety of cancer, diabetes, and atherosclerosis.

In prior consideration of oxidative stress two major components were briefly considered, described namely in the section of lipids and proteins.

By a definition oxidative stress is defined as an imbalance between pro- and antioxidants, leading to irreversible cell damage. Reduction of monovalent oxygen results in the formation of activated oxygen species including free radicals (superoxide, anion, hydroxyl radical, hydrogen peroxide, and singlet oxygen). All of these species are potentially toxic to the organism because they can inactivate proteins and damage DNA alter genetic message, degrade sugars, oxidize lipoproteins and initiate membrane lipids peroxidation. Under normal circumstances, organism produces activated oxygen species in a continuous fashion, but an effective antioxidant defense system regulated this production so as to prevent excessive cell damage. At the same time, overproduction of activated oxygen species due to activation of various mechanisms can rapidly overpower the antioxidant oxidative stress. In order to support natural antioxidants (vitamins, enzymes, and oligo elements) we provide an externally supported electrochemical method described in details further down.

The invention provides a method and apparatus that reduce oxidative stress by modulating levels of oxidants in an organ to be transplanted. As a consequence, oxidative shock is significantly reduced. This method finds direct applications in organ transplants of kidney, heart, liver and other organs.

Oxidative Stress Organ Transplants

The present invention provides an apparatus and method for organ transplants in the presence of a source of electrons to maintain and supplement loss of the anti-oxidants content in the organs.

An aspect of the present invention is to reduce oxidative stress risks during a process of organ transplantation. An additional aspect is to provide additives that can reduce oxidative stress.

In accordance with one aspect of the invention, a method of organ transplanting electron-enriched organ is provided wherein an electron source is provided in connection with a transplanting vessel source replenishes and/or increases the electron content of the organ being transplanted.

In accordance with another aspect of the invention, a transplanting utensil is provided for containing organ during a transplanting process, wherein the transplanting utensil includes a source of electrons for introduction to organ matter contained within the utensil.

In accordance with another aspect of the invention a method for organ to be transplanted without depleting the electron content of the organ is provided wherein organ is placed in a transplanting medium contained in a volumetric body and an electric current is applied to flow through the transplanting medium to provide free electrons for absorption by the organ during a transplanting process.

In accordance with still another aspect of the invention a method for organ to be transplanted in a transplanting medium without substantially depleting the electron content of the organ is provided wherein an antioxidant is added to the transplanting medium during a transplanting process to control oxidation of the organ being transplanted.

Preferred Embodiments

The present invention contemplates several embodiments and equivalents that enable efficient maintenance and supplementation of electron content to organ prepared for transplantation within a utensil or vessel.

Summarizing, an electrochemical apparatus and method provide a source of electrons to a living organ in the process of transplantation. The organ, depleted of antioxidants, is placed into a vessel supplied with appropriate physiological solution and apparatus that create antioxidative environment.

With reference to FIG. 1, a transplanting apparatus includes a vessel V (chemically inert plastic or TEFLON® (polytetrafluoroethylene)) having sufficient volume to contain organ O (heart, kidney or something else) to be transplanted and a quantity of physiological medium P (physiological solution at appropriate temperature). The vessel V may be a variety of transplanting vessels. If the vessel is metal or other electrically conductive material, it may be electrically insulated with appropriate coating, etc.

A reference electrode R (e.g., Silver/silver chloride Ag/AgCl or platinum/platinum hydride Pt/PtH), a working electrode W (e.g., platinum electrode in contact with physiological solution or the organ itself) and a counter electrode C (e.g., Gold Au electrode) electrodes are positioned in the interior of the vessel V and connected to a controllable variable external current source CP (e.g., a potentiostat that may be/or not be controlled by a computer processor) to create a current and electron flow within the liquid P in which the organ matter O is placed. Each electrode may be comprised of one or more electrodes. Also working electrode W and counter electrode C may be, for example, of gold, silver or platinum, and reference electrode R may be, for example, platinum as is described herein. Instead of a potentiostatic electron source primary or low voltage batteries may be used. The source CP may be a battery, a connection to a conventional electrical outlet preferably via a low voltage transformer, or other source of electric energy, preferably electrons.

As current flows from medium P there is provided an electron source for absorption by organ O. Excess electrons flowing from electrodes act as antioxidant and reduce oxidized species in organ to be transplanted thus reducing oxidative stress. Bridge B (e.g., a plastic or TEFLON® (polytetrafluoroethylene)) tubing containing physiological solution-both ends of the tubing bridge are ending with a fritted-porous glass) serves as a system that keeps electrochemical potential at the same level as in a transplanted organ O and human body. The vessel V can itself serve as an anode or cathode.

The invention provides an electric field between the electrodes so that current will flow. Therefore, the organ O tends to be located in a reducing medium rather than in an oxidizing medium; or at least the extent of oxidation is reduced. Thus, the tendency is for the organ to enjoy diminished oxidative stress.

In exemplary embodiments, the method of reducing oxidative stress is achieved without depleting the electron content of an organ to be transplanted. The exemplary method includes the steps of: placing the human organ O within the medium P containing a volumetric body, and applying an electric current of sufficient magnitude, to create a reducing environment, to flow through said organ O to be transplanted, to provide said reducing environment in which the human organ is held.

In exemplary embodiments, applying the electric current includes supplying free electrons for absorption by said human organ.

In exemplary embodiments, the electric current applied is a low voltage DC current, such as from a battery, solar cell, or other suitable source of power.

In exemplary embodiments, the voltage during the applying the electric current may be in the range of 1 to 15 volts, more preferably in the range of 1 to 1.5 volts, such as 1, 1.25, or 1.5 volts. It is understood, however, that the voltage to create a reducing environment may be less than 1 volt or greater than 1.5 volts depending on the particular application, as would be understood by those having ordinary skill in the art.

In exemplary embodiments, the current during the applying the electric current may be in the range of 0.1 to 900 milliamps, such as 0.1, 1, 10, 25, 50, 75, 100, 200, 500, 750, or 900 milliamps. It is understood, however, that the current to create a reducing environment may be different, such as greater or less than 900 milliamps, depending on the particular application, as would be understood by those having ordinary skill in the art.

Chemical electron donation can be accomplished in accordance with the invention by, for example, the use of thermally labile natural and/or man-made compounds, either isolated or in the bulk matrix, that release antioxidants upon thermal excitation to provide a source of electrons.

Antioxidants, being good electron donors, are excellent inhibitors of oxidative chain reactions.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of reducing oxidative stress without depleting the electron content of an organ to be transplanted, the method comprising the steps of: placing a human organ within a medium contained in a volumetric body, and applying an electric current of sufficient magnitude to create a reducing environment to flow through said organ to be transplanted, and to provide said reducing environment in which the human organ is held, wherein said applying the electric current comprises supplying free electrons for absorption by said human organ, and wherein said electric current is provided by an electric circuit integrally attached to said volumetric body, wherein the current is a low voltage DC current, wherein the voltage during the applying the electric current is in the range of 1 to 1.5 volts, and wherein the current during the applying is in the range of 0.1 to 900 milliamps.

2. The method of claim 1, wherein said medium is in a liquid state.

3. The method of claim 1, wherein said electric current is provided by a solar cell.

4. The method of claim 1, wherein said electric current is provided by a thermocouple.

5. The method of claim 1, wherein said electric current is provided by an electrochemical potentiostat.

* * * * *